(12) United States Patent
Gual

(10) Patent No.: US 6,309,172 B1
(45) Date of Patent: Oct. 30, 2001

(54) WIND TURBINE WITH LOW VERTICAL AXIS

(76) Inventor: Georges Gual, Résidence Colline Saint-Pierre 1263, Avenue Trolley de Prevaux, F - 83200 Toulon (FR)

( * ) Notice: Subject to any disclaimer, the term of this patent is extended or adjusted under 35 U.S.C. 154(b) by 0 days.

(21) Appl. No.: 09/242,443

(22) PCT Filed: Aug. 14, 1997

(86) PCT No.: PCT/FR97/01490

§ 371 Date: Aug. 16, 1999

§ 102(e) Date: Aug. 16, 1999

(87) PCT Pub. No.: WO98/07981

PCT Pub. Date: Feb. 26, 1998

(30) Foreign Application Priority Data

Aug. 23, 1996 (FR) .................................................. 96 10537

(51) Int. Cl.[7] ...................................................... F03D 7/06
(52) U.S. Cl. ............................................ 415/4.4; 415/907
(58) Field of Search ............................. 415/4.2, 4.4, 907, 415/915, 185, 191, 208.2

(56) References Cited

U.S. PATENT DOCUMENTS

| | | | |
|---|---|---|---|
| 2,169,149 | 8/1939 | Johanson | 170/17 |
| 3,645,192 | 2/1972 | Rousey | 98/75 |
| 4,047,834 | 9/1977 | Magoveny et al. | 415/907 |
| 4,142,822 | 3/1979 | Herbert et al. | 415/2 |
| 4,362,470 | 12/1982 | Locastro et al. | 416/197 A |
| 5,020,967 | * 6/1991 | Gual et al. | 415/4.4 |
| 5,380,149 | * 1/1995 | Valsamidis | 415/4.4 |

FOREIGN PATENT DOCUMENTS

| | | | |
|---|---|---|---|
| 2 509 801 | 1/1983 | (FR) . | |
| 2 556 783 | 6/1985 | (FR) . | |
| 2 624 210 | 4/1990 | (FR) | F03D/3/00 |
| 2 049 066 A | 12/1980 | (GB) | F03D/3/04 |

* cited by examiner

Primary Examiner—Christopher Verdier
Assistant Examiner—Richard Woo
(74) Attorney, Agent, or Firm—Allen, Dyer Doppelt Milbrath & Gilchrist, P.A.

(57) ABSTRACT

A wind module includes a base plate, a turbine rotatably mounted on the base plate, a plurality of directional fins carried by the base plate peripherally adjacent said turbine, and a cover plate over the turbine and plurality of directional fins. The cover plate may have a domed shape. The plurality of vertical blades may be eight or more in number. In addition, each vertical blade may have an asymmetrical profile based on an aircraft wing which favors a double thrust and drag effect The directional fins may also have an asymmetrical profile to accelerate wind flow. The turbine, base plate, cover plate, and each of the directional fins is preferably integrally formed as a single piece to facilitate assembly.

13 Claims, 1 Drawing Sheet

WIND TURBINE WITH LOW VERTICAL AXIS

FIELD OF THE INVENTION

The invention relates to wind turbines, and, more particularly, to wind turbines including peripheral directional fins or blades and associated methods.

BACKGROUND OF THE INVENTION

According to the prior art and according to the French publication Nos. FR 25099801A (5/1984), FR 2556783A (6/1987) and FR 2624210A (4/1990) pertaining to a static wind module and a three-function turbine, all wind machines generate turbulence and vibrations that are detrimental to efficiency and reliability. Furthermore, the machining and assembling of a multitude of elementary parts considerably reduces the competitivity of the product.

SUMMARY OF THE INVENTION

The present invention is aimed at overcoming this state of affairs by means of a comprehensive restructuring characterized by a molding, in a single operation, of only four monolithic blocks constituting a turbine with eight blades whose number may vary, a base plate, a slightly domed, circular flat cover plate and peripheral directional small fins with an asymmetrical profile whose number may also vary.

DETAILED DESCRIPTION OF THE PREFERRED EMBODIMENTS

Figure 1:
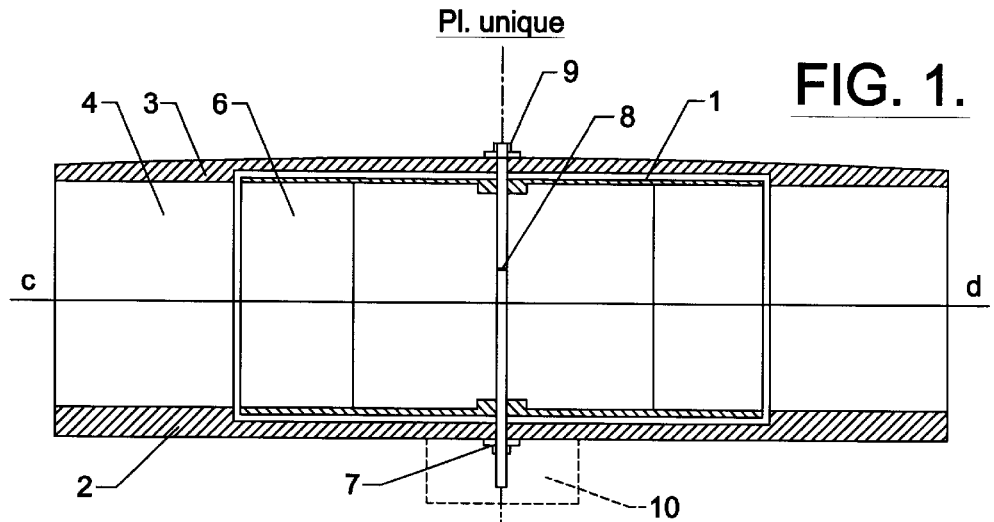
FIG. 1 is a cross-sectional view of the wind turbine in accordance with the present invention.

Thus, the turbine (1) FIG. 1 is formed by a cylindrical body (5) which, during the molding, fixedly joins together the peripheral set of asymmetrically profiled vertical blades (6) whose design is based on the aircraft wing which is favorable to the double thrust and drag effect.

Figure 2:
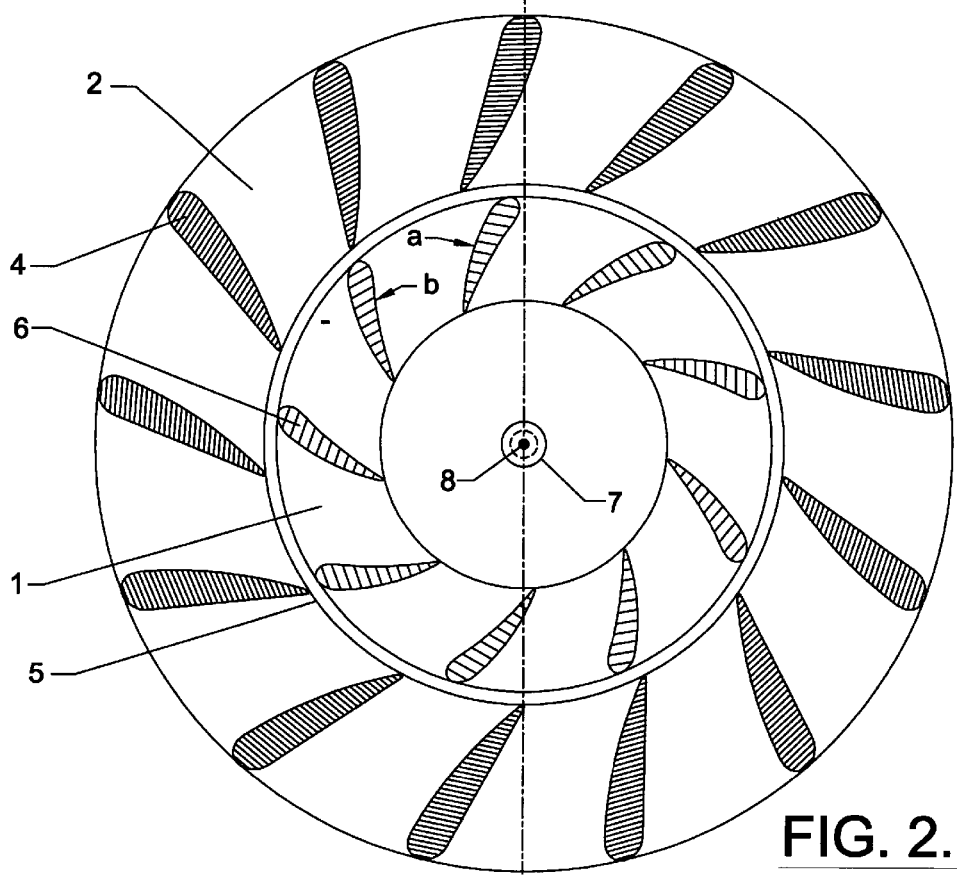
FIG. 2 is a cross-section view of the wind turbine of FIG. 1 taken along lines CD.

The base plate (2) FIG. 2 has a bearing (7) at its center in which the vertical shaft of the turbine (8) pivots. Furthermore, this base plate (2) has, on its periphery, a series of vertical small fins (4) which create an equivalent number of pressure surfaces and suction surfaces which channel and orient the air flow in the extension of the incurvated end of each blade, corresponding to the point of interaction a (depression) as well as the rectilinear part where the active pressure b (stress) is exerted.

At its center, the cover plate (3) has a self-aligning bearing (9) holding the vertical shaft of the turbine (8). Consequently, at each revolution of the turbine (1), each of the blades (6) intercepts two effects: a main action at the point of interaction a and a depression at the point b.

The advantages of a four-monolith restructuring of a static wind module of this kind including a turbine with double driving power (1) are: improved efficiency, reliability and competitivity.

The design of wind sensor module is characterized by the assembling of three complementary elements cast in a single piece, a slightly domed protective cover plate (3), a turbine (1), and a base plate (2) provided with directional peripheral small fins (4). The turbine (1) comprises a cylindrical body formed by eight or more (6) vertical blades. Each blade possesses an asymmetrical profile based on the aircraft wing which favors the double thrust and drag effect. The base plate (4) comprises peripheral small fins (4) also with an asymmetrical profile, in order to accelerate the wind flow. An energy-receiving housing (10) is provide beneath the base plate (2).

The module enables the interception of winds from all directions, in that it includes directional, external, peripheral fins (4). The assembling of the three elements, that is, the cover plate (3), base plate (2) and directional small fins (4), forms a protective streamline fairing with respect to the immediate environment. The static wind module has a flat shape and set of peripheral directional fins (4) that enable the interception of winds from all directions and of any force, without regulation and without making use of any system of orientation.

What is claimed is:

1. A wind module comprising:
   a base plate;
   a turbine rotatably mounted on the base plate, the turbine including at least eight vertical blades non-radially positioned in the turbine, and each of the blades having an asymmetrical aircraft wing profile;
   a plurality of directional fins non-radially positioned on the base plate peripherally adjacent the blades of the turbine, each of the fins having an asymmetrical aircraft wing profile which is inverted with respect to the asymmetrical aircraft wing profile of the blades to produce a double thrust and drag effect; and
   a cover plate over the turbine and the plurality of directional fins;
   the asymmetrical aircraft wing profile of the blades and the fins comprising a plano-convex profile; and
   the blades having leading edges disposed adjacent to trailing edges of the fins.

2. A wind module according to claim 1 wherein wind flow is directed in a non-radial direction.

3. A wind module according to claim 1 further comprising:
   an output shaft connected to the turbine; and
   a mount for rotatably mounting the output shaft on the base plate.

4. A wind module according to claim 1 wherein the base plate is integrally formed as a single piece.

5. A wind module according to claim 1 wherein the turbine is integrally formed as a single piece.

6. A wind module according to claim 1 wherein the cover plate is integrally formed as a single piece.

7. A wind module according to claim 1 wherein each of the fins is integrally formed as a single piece.

8. A wind module comprising:
   a base plate integrally formed as a single piece;
   a turbine integrally formed as a single piece and rotatably mounted on the base plate, the turbine including at least eight vertical blades non-radially positioned in the turbine, and each of the blades having an asymmetrical aircraft wing profile;
   a plurality of directional fins non-radially positioned on the base plate peripherally adjacent the blades of the turbine, each of the fins being integrally formed as a single piece and having an asymmetrical aircraft wing profile which is opposite to the asymmetrical aircraft wing profile of the blades; and
   a cover plate integrally formed as a single piece and positioned over the turbine and the plurality of directional fins;

the asymmetrical aircraft wing profile of the blades and the fins comprising a plano-convex profile; and the blades having leading edges disposed adjacent to trailing edges of the fins.

9. A wind module according to claim 8 wherein wind flow is directed in a non-radial direction.

10. A wind module according to claim 8 further comprising:

an output shaft connected to the turbine; and a mount for rotatably mounting the output shaft on the base plate.

11. A method of making a wind module comprising:

integrally forming a base plate as a single piece;

integrally forming a turbine as a single piece and rotatably mounting the turbine on the base plate, the turbine including at least eight vertical blades non-radially positioned in the turbine, and each of the blades having an asymmetrical aircraft wing profile;

integrally forming a plurality of directional fins and positioning the fins non-radially on the base plate peripherally adjacent the blades of the turbine, each of the fins having an asymmetrical aircraft wing profile which is opposite to the asymmetrical aircraft wing profile of the blades; and integrally forming a cover plate as a single piece and positioning the cover plate over the turbine and the plurality of directional fins;

the asymmetrical aircraft wing profile of the blades and the fins comprising a plano-convex profile; and the blades having leading edges disposed adjacent to trailing edges of the fins.

12. A method according to claim 11 wherein wind flow is directed in a non-radial direction.

13. A method according to claim 11 further comprising:

connecting an output shaft to the turbine; and rotatably mounting the output shaft on the base plate.

* * * * *